United States Patent
Monahan et al.

(10) Patent No.: US 6,549,123 B1
(45) Date of Patent: Apr. 15, 2003

(54) AUTOMOBILE HOOD SAFETY SWITCH

(76) Inventors: Robert Barret Monahan, 379 Maple St., Bellingham, MA (US) 02019; Peter Ernest Magnuson, Sr., 107 Woolford Rd., Wrentham, MA (US) 02093; Albert Eart Magnuson, Jr., 420 Mendon Rd., North Attleboro, MA (US) 02760

( * ) Notice: Subject to any disclaimer, the term of this patent is extended or adjusted under 35 U.S.C. 154(b) by 0 days.

(21) Appl. No.: 09/994,040

(22) Filed: Nov. 14, 2001

(51) Int. Cl.⁷ .................................................. B60Q 1/00
(52) U.S. Cl. .................. 340/425.5; 340/568.1; 340/571; 340/471; 340/473; 307/10.3; 307/10.1; 307/10.6; 362/459; 362/487; 362/496
(58) Field of Search ............................... 340/425.5, 426, 340/438, 428, 429, 568.1, 571, 468, 471, 473; 70/237, 240, 241; 307/10.3, 10.1, 10.6; 362/459, 487, 496

(56) References Cited

U.S. PATENT DOCUMENTS

| | | | | |
|---|---|---|---|---|
| 3,858,175 A | * | 12/1974 | Kopera, Jr. | 340/426 |
| 3,885,164 A | * | 5/1975 | Vest | 307/10.3 |
| 3,930,226 A | * | 12/1975 | Plumberg | 340/430 |
| 4,151,508 A | * | 4/1979 | Hensler et al. | 307/10.2 |
| 4,589,514 A | * | 5/1986 | Wilson et al. | 70/241 |
| 4,702,094 A | * | 10/1987 | Peterson | 70/241 |
| 4,740,775 A | * | 4/1988 | Price | 340/539 |
| 5,015,991 A | * | 5/1991 | Barr | 340/456 |
| 5,477,090 A | * | 12/1995 | Davis | 340/825.69 |
| 5,623,245 A | * | 4/1997 | Gilmore | 340/426 |
| 5,644,287 A | * | 7/1997 | Nouri | 340/426 |
| 5,680,095 A | * | 10/1997 | Nassouri | 340/426 |
| 5,763,957 A | * | 6/1998 | Kusunoki | 307/10.2 |
| 6,392,534 B1 | * | 1/2000 | Flick | 340/426 |
| 6,433,677 B1 | * | 8/2000 | Flick | 340/426 |

* cited by examiner

Primary Examiner—Daniel J. Wu
Assistant Examiner—Daniel Previl
(74) Attorney, Agent, or Firm—Paul J. Cook

(57) ABSTRACT

A warning system for a hood of a vehicle is provided which includes a switch electrically connected to a vehicle ignition, a vehicle starter, warning indicia, and a power source. The warning indicia receives power from the power source and the starter is unconnected to the power when the switch is in an open position. The vehicle ignition and the vehicle starter receives power from the power source when the switch is in a closed position. The switch includes a movable contactor to close the switch when the hood is locked to the vehicle and to open the switch when said hood is not locked to the vehicle.

10 Claims, 3 Drawing Sheets

AUTOMOBILE HOOD SAFETY SWITCH

BACKGROUND OF THE INVENTION

This invention relates to a hood safety switch for a vehicle and to a system for alerting a road vehicle operator of an unlatched hood of the vehicle so that the operator can latch the hood prior to driving the vehicle.

A hood of a road vehicle such as an automobile or a truck usually is positioned in one of three positions: an open position, a locked position and a safety position where the hood can be moved only a short distance such as about 2 inches or less. When the hood is in a safety position, an operator can open the hood by releasing a latch located under the hood by hand. The safety position for the hood is designed to provide a restraint for the hood should the vehicle be driven accidently when the hood is not in the locked position thereby to prevent the hood from being raised to a point where it contacts the windshield or obstructs the operator's view.

However, even when the hood is in the safety position, it is possible that when the vehicle is operated at a high speed, the force of air moving under the hood will exceed the force provided by the hand releasable latch and the hood will raise to a position where it will dangerously obscure the drivers view or will break the windshield.

Accordingly, it would be desirable to provide an apparatus and a system which alerts a vehicle operator to the hood of a vehicle being in the unlocked or safety position. In addition, it would be desirable to provide such an apparatus or system which prevents the vehicle from being started. Such an apparatus and system would prevent the hood from opening while the vehicle is being driven.

SUMMARY OF THE INVENTION

The present invention provides an apparatus and system for alerting a vehicle operator to an unlocked hood or the vehicle either by activating a warning indicia or preventing the start-up of the vehicle. A switch is positioned either open or closed in response to a position of the vehicle hood. When the hood is locked, the switch is in a "closed" position in an electrical circuit so that a conventional vehicle ignition can be activated by a conventional vehicle starter and a warning indicia is inactivated. When the hood is either open or in a safety position (unlocked) the switch is in an "open" position so that the vehicle ignition cannot be activated from an inactivated state while a warning indicia is inactivated. By operating in this manner, the vehicle engine cannot be started while the warning indicia is activated or the warning indicia is activated if the engine is running. In either event, the vehicle operator is alerted to the fact that the hood is unlocked so that the operator can lock the hood.

DESCRIPTION OF SPECIFIC EMBODIMENTS

In accordance with this invention, a switch positioned in an electrical circuit between a conventional vehicle ignition switch and a conventional vehicle starter. In addition, a warning indicia is included in the electrical circuit. When the switch is closed, the starter can be activated by the ignition switch. When the switch is open, the starter cannot be activated by the ignition switch and the warning indicia is activated. The warning indicia can be any device which can be discerned such as a warning light, an alarm, a buzzer or the like.

Figure 1:
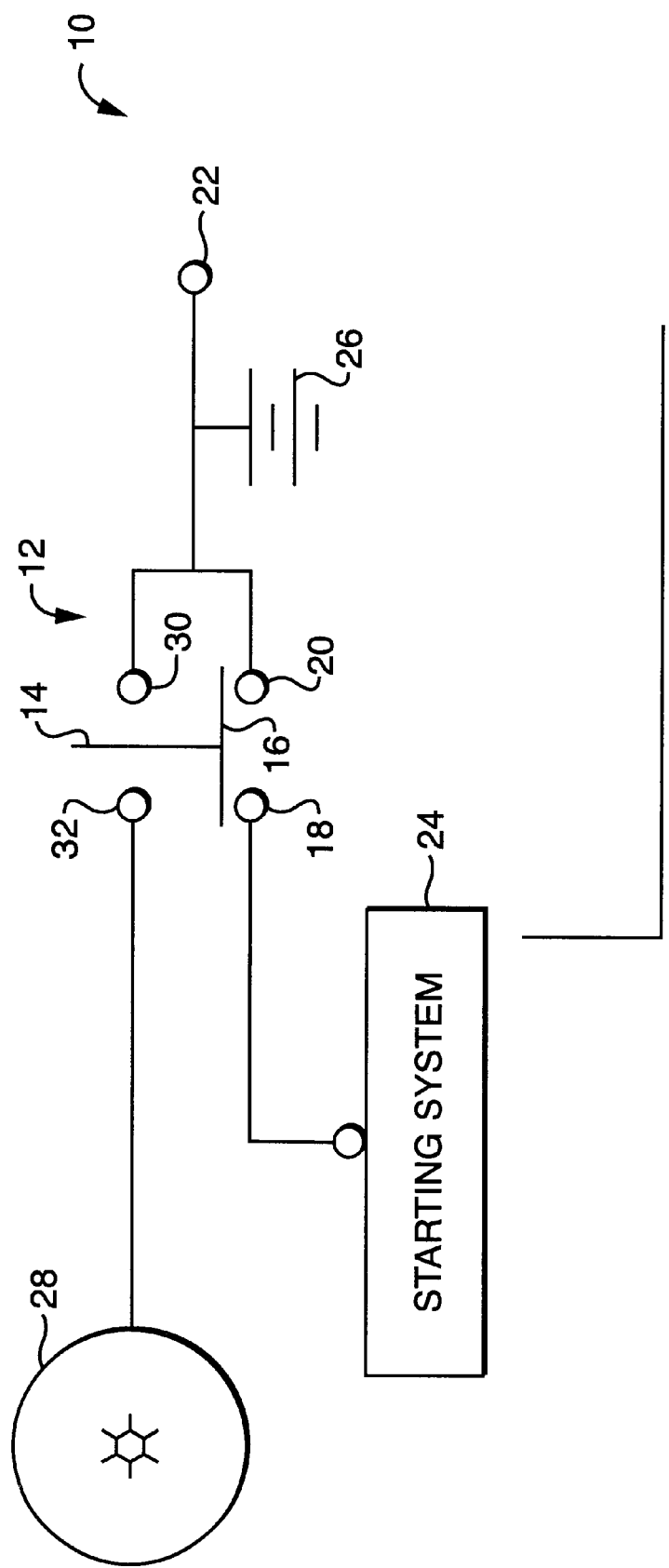
FIG. 1 is a schematic diagram of the system of this invention.

Referring to FIG. 1, the hood open warning circuit of this invention 10 includes a switch 12 with an electrical contactor 14 having a contact plate 16. The switch 12 can be closed when the contact plate 16 contacts leads 18 and 20 so that ignition switch 22 can activate the vehicle starting system 24 with the power from car battery 26. When the contactor is in the closed position, the warning indicia 28 such as a lamp which can be located on the car dashboard is inactivated. The contactor 14 is spring loaded so that the force of a closed vehicle hood is required to position the switch 12 in the closed position. When the switch 12 is open, contact plate 16 contacts leads 30 and 32. When the switch 12 is open, warning indicia 28 is activated so that the vehicle operator can see it or hear it to convey the fact that the vehicle hood is not locked, i.e., is in the open position or the safety position. When the switch 12 is open, the ignition switch 22 cannot activate starter 24. If the vehicle engine is activated when the hood is unlocked, the warning indicia 28 is activated, the vehicle operator is alerted by the warning indicia 28 so that the vehicle hood is unlocked.

Figure 2:
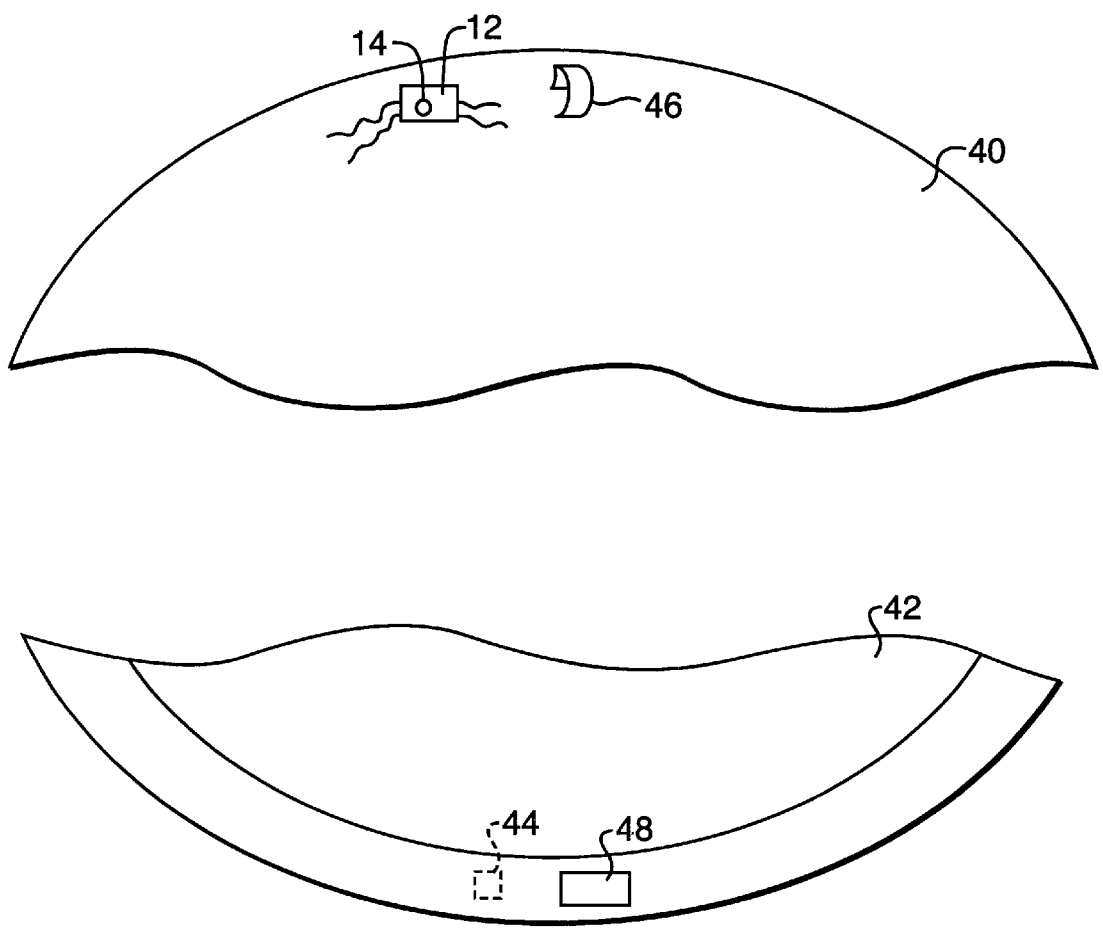
FIG. 2 is a partial perspective view of the apparatus of this invention positioned in a vehicle.

Referring to FIG. 2, a vehicle hood 40 and engine housing 42 are shown. The switch 12 is positioned on the underside surface of hood 40. Alternatively, the switch 12 can be located on the engine housing 42. The electrical contactor 14 extends through the housing of switch 12 and, when the hood 40 is in the locked position, it contacts area 44 of engine housing 42 to position the switch 12 in the closed position as described above. The hood 40 is locked by means of conventional hook 46 which interacts with conventional slot 48 to lock the hood 40. When the switch 12 is positioned as shown in FIG. 2, the switch 12 is open as a described above.

Figure 3:
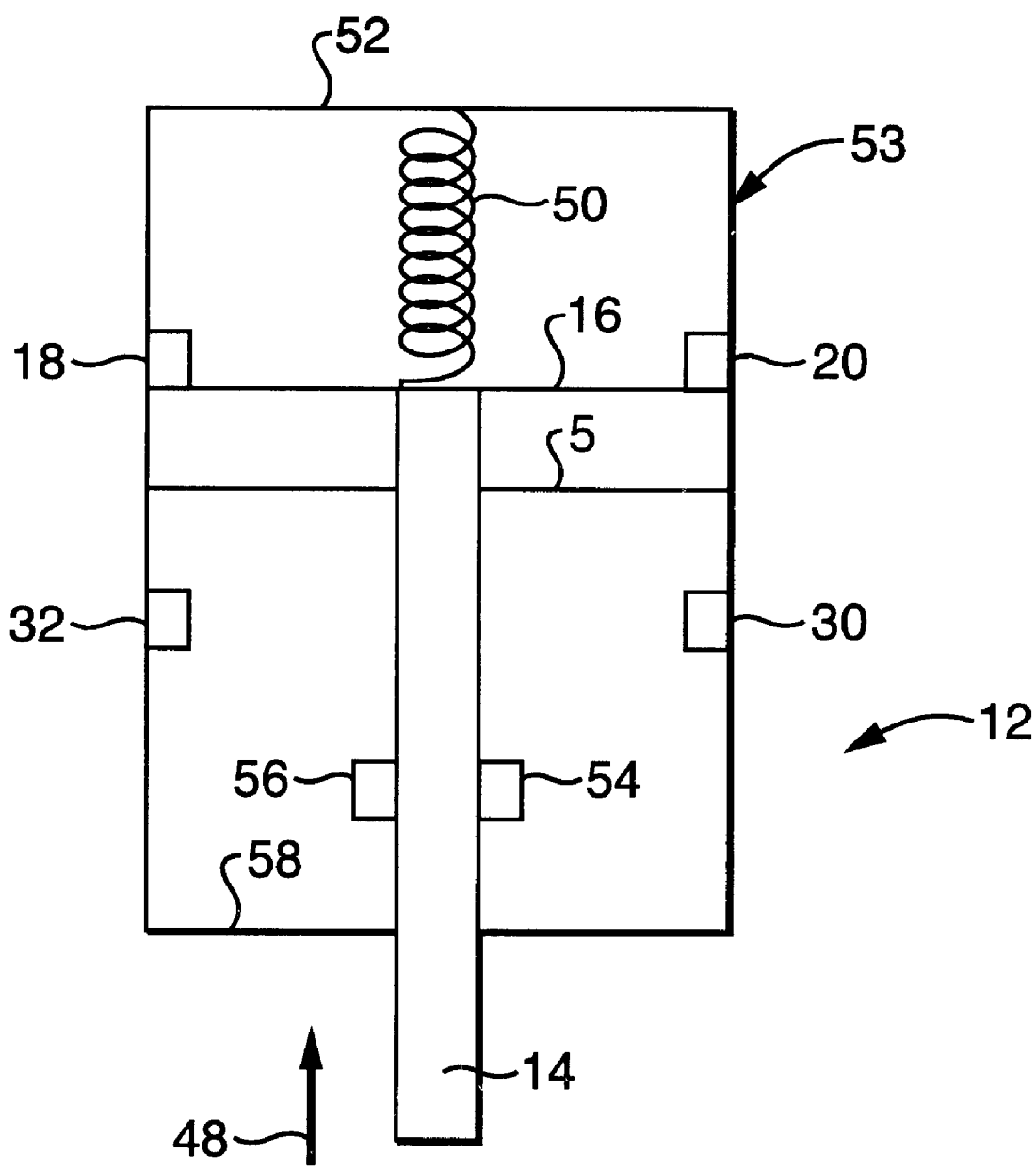
FIG. 3 is a cross-sectional view of a switch which is useful in the system and apparatus of this invention.

Referring to FIG. 3, the switch 12 can include two contact plates 16 and 15. Alternatively, the switch 12 can comprise a single contact plate 16. As shown in FIG. 3, the switch 12 is shown in the closed position wherein contact plate 16 contacts leads 18 and 20 to effect the result set forth above. The force of the closed hood 40 as indicated by arrow 48 forces the electrical contactor 14 and plate 16 against the force of spring 50 which contacts plate 16 and the inner surface 52 of switch housing 53. When the force 48 is removed when the hood 40 is unlocked, electrical contactor 14 is moved away from leads 18 and 20 so that plate 15 contacts leads 30 and 32 to effect the result set forth above. Alternatively, plate 15 can be eliminated so that plate 16 contacts leads 30 and 32. The extent of axial movement of electrical contactor 14 is controlled by stops 54 and 56 secured to electrical contactor 14. Stops 50 and 56 contact the inner top surface 58 of switch 12.

We claim:
1. A warning system for detecting when a hood of a vehicle is open, said system comprising:
 a switch being electrically connected to a vehicle ignition, a vehicle starter, warning indicia, and to a power source said warning indicia receiving power from the power source and said starter being unconnected to said power when the switch is in an open position,
 said vehicle ignition and said vehicle starter receiving power from said power source when said switch is in a closed position, and a movable contactor within said switch placing said switch in said closed position when said hood is locked to said vehicle by a hook and placing said switch in said open position when said hood is not locked to said vehicle, so that when said hood is open, either an engine for said vehicle cannot be started or said warning indicia is activated when said engine is running.

2. The system according to claim 1 wherein the warning indicia provides an alarm signal when said switch is open.

3. The system according to claim 2 wherein the alarm signal is a light.

4. The system according to claim 2 wherein the alarm signal is a flashing light.

5. The system according to claim 2 wherein the alarm signal emits a sound.

6. A method for detecting when a hood of a vehicle is open, said system comprising:

providing a switch being electrically connected to a vehicle ignition, a vehicle starter, warning indicia, and to a power source, said warning indicia receiving power from the power source and said starter being unconnected to said power when the switch is in an open position, said vehicle ignition and said vehicle starter receiving power from said power source when said switch is in a closed position, providing a movable contactor within said switch placing said switch in said closed position when said hood is locked to said vehicle by a hook and placing said switch in said open position when said hood is not locked to said vehicle, so that when said hood is open, either an engine for said vehicle cannot be started or said warning indicia is activated when said engine is running, and monitoring said warning indicia.

7. The method according to claim 6 wherein the warning indicia provides an alarm signal when said switch is open.

8. The method according to claim 7 wherein the alarm signal is a light.

9. The method according to claim 7 wherein the alarm signal is a flashing light.

10. The method according to claim 7 wherein the alarm signal emits a sound.

* * * * *